United States Patent [19]

Campbell et al.

[11] Patent Number: 5,432,763
[45] Date of Patent: Jul. 11, 1995

[54] SUBMINIATURE ROTARY ACTUATOR OPTICAL HEAD

[75] Inventors: David K. Campbell, Loveland, Colo.; Daniel R. Marshall; David K. Towner, both of Boise, Id.

[73] Assignee: Hewlett-Packard Company, Palo Alto, Calif.

[21] Appl. No.: 325,532

[22] Filed: Oct. 18, 1994

Related U.S. Application Data

[63] Continuation of Ser. No. 53,116, Apr. 27, 1993, abandoned, which is a continuation of Ser. No. 31,766, Mar. 15, 1993, abandoned.

[51] Int. Cl.$^6$ ................................................. G11B 7/00
[52] U.S. Cl. ........................ 369/44.19; 369/44.14; 369/13; 369/112
[58] Field of Search .............. 369/44.11, 44.14, 44.15, 369/44.16, 44.17, 44.18, 44.19, 44.21, 110, 13, 112

[56] References Cited

U.S. PATENT DOCUMENTS

| | | | |
|---|---|---|---|
| 4,004,081 | 1/1977 | Zorn | 369/44.19 |
| 4,367,009 | 1/1983 | Suzki | 359/618 |
| 4,539,664 | 9/1985 | Deguchi et al. | 369/44.28 |
| 4,669,073 | 5/1987 | Wakabayashi et al. | 369/44.19 |
| 4,679,904 | 7/1987 | Kurihara | 369/44.16 |
| 4,688,201 | 8/1987 | Towner et al. | |
| 4,761,774 | 8/1988 | Ishibashi et al. | |
| 4,766,583 | 8/1988 | Oinoue et al. | 369/44.16 |
| 4,864,118 | 9/1989 | Opheij et al. | 369/44.14 |
| 5,070,493 | 12/1991 | Marshall et al. | 369/112 |
| 5,153,870 | 10/1992 | Lee et al. | 369/44.19 |
| 5,233,587 | 8/1993 | Asano et al. | 369/44.19 |
| 5,258,971 | 11/1993 | Yamamoto et al. | 369/44.14 |

FOREIGN PATENT DOCUMENTS

| | | | |
|---|---|---|---|
| 60-214438 | 4/1984 | Japan | |
| 63-032755 | 7/1986 | Japan | |
| 63-020732 | 1/1988 | Japan | 369/44.19 |
| 63-247938 | 10/1988 | Japan | 369/110 |
| 01217734 | 8/1989 | Japan | 369/44.21 |

OTHER PUBLICATIONS

Wright, Maury; Mass-Storage Devices: Price and Size Shrink while Capacity Grows, Comdex Trends, Oct. 10, 1991, pp. 111, 113-114, 118 & 120.

Meiklejohn, W. H., Magnetooptics: A Thermomagnetic Recording Technology, Proceedings of the IEEE, vol. 74, No. 11, Nov. 1981, pp. 1570-1581.

Primary Examiner—Georgia Y. Epps
Assistant Examiner—P. W. Huber
Attorney, Agent, or Firm—Cynthia S. Baan

[57] ABSTRACT

A miniature rotary actuator optical head assembly incorporating data and servo detecting elements mounted inside a source/detector module, which is located on the rotary actuator arm adjacent to the pivot point of the rotary actuator arm. The miniature rotary actuator optical head also includes a miniature focus motor which supports a fold mirror and an objective lens and repositions the fold mirror and objective lens simultaneously whenever a focus error is received. The focus motor can be actuated by a magnetic bias field that originates external to the rotary actuator arm, particularly the magnetic bias field generated for magneto-optical recordation. The optical assembly may also include two stage tracking by mounting the light source on a pair of lateral movement flexures and supplying a fine tracking error signal to actuate the movement of the light source.

8 Claims, 13 Drawing Sheets

SUBMINIATURE ROTARY ACTUATOR OPTICAL HEAD

This application is a continuation of application Ser. No. 08/053,116 filed Apr. 27, 1993 which in turn is a continuation of application Ser. No. 08/031,766 filed Mar. 15, 1993.

FIELD OF INVENTION

The present invention relates generally to the field of information storage and retrieval systems and more particularly to optical and magneto-optical information storage and retrieval systems, in which data is recorded on and read from rotating optical data storage disks. In particular, this invention provides an improved, low profile optical head assembly, including an improved focus assembly and an improved tracking assembly.

BACKGROUND OF THE INVENTION

Information storage and retrieval systems, particularly those used in computer systems, typically record data magnetically, optically or magneto-optically onto several types of storage media, rotating magnetic or optic tape or disks for example. Such storage media may be utilized for document files, computer output memories, compact disk players, hard disk drives and the like. Depending on the type of storage media and recordation system, information may be recorded only once and then retrieved many times or it may be recorded, retrieved, erased and re-recorded indefinitely. Generally, the media of optical storage systems, such as compact disks, can only be written once and read many times. The limiting feature of tape recording systems is that the media deteriorates with use and time. Although the degeneration does not occur as quickly, magnetic disk media also wear and have a limited life span. While there are removable magnetic recording systems, typically, these systems are not suited for removability and long term reliability is a constant problem with such systems, due to the media's susceptibility to data corruption and erasure by outside stimuli, such as stray electro-magnetic fields. On the other hand, magneto-optical storage has the advantage of indefinite recording and erasure cycles without media deterioration problems and the media has the added advantage of removability and transportability between drives, as the media with its built in dust protection and non-contact operation is remarkably stable against normal outside influences.

Data stored on disks, whether magnetic, optical or magneto-optical, is contained within thousands of spiral or concentric tracks about the disk center. The total number of tracks and thus the storage capacity of the disk depends on the diameter of the disk utilized and the method of recordation of the disk. The amount of information that can be stored per unit area on the optical or magneto-optical media surface is much greater than the amount that can be stored on magnetic media, because the precision of an optical stylus is about 1 $\mu$m, allowing the tracks to be spaced closely together. On the other hand, the track spacing of magnetic disks is limited to greater than 15 $\mu$m, due to track runout and the signal to noise considerations of electromagnetic fields. Accordingly, the recording density of an optical or magneto-optical disk is between 10 and 100 times greater than that of a magnetic disk.

In both magnetic recording and magneto-optical recording, information is stored on a storage disk by orienting the magnetic field of the media at given points or bits along a given track. In order to record, access and read data on a disk, a transducer head (in the case of magnetic recording) or an optical head (in the case of magneto-optical recording, FIG. 1) is moved along a generally radial path across the surface of the storage disk as the storage disk is rotated. The generally radial movement of the transducer head in the case of magnetic recording or the optical head in the case of magneto-optical recording will either follow a straight line path or an arcuate path, depending upon whether a linear or rotary actuator is utilized to position the head.

The principles of magneto-optical storage are well known. Information is recorded on and erased from a thin film of magnetic material which is deposited on a substrate of suitable material. Information is encoded and stored in a sequence of magnetic bits oriented normal to the storage media surface in either of two possible orientations, north pole up or north pole down for example. To erase a track, all of its magnetized bits are oriented in one direction. Typically, for magneto-optical media, the magnetic or coercive force required to reverse a magnetic bit from, say, north pole up to north pole down, varies greatly with the temperature of the media. At room temperature, magneto-optical material is relatively resistant to changes in magnetization. The measure of this resistance is called coercivity. The coercivity of the material used in magneto-optical recording can be readily altered at a high temperature, called the Curie point. At the Curie point, about 150° C., the coercive force necessary to reverse the magnetization decreases substantially and the magnetization may be reversed by a relatively small magnet or electromagnet.

Typically, magneto-optical storage devices comprise an optical head including lasers, collimating lenses, beam shaping prisms, beamsplitters, plane mirrors, an objective lens, a focus positioner, a tracking positioner, collecting lenses and detectors, as noted in prior art FIG. 1. These components are, as would be expected, complex, expensive and increase the mass and size of the optical head. Referring to prior art FIG. 1, a conventional magneto-optical head assembly 27 and its operation will now be described. During a recording operation, a laser diode 10 provides the heat source necessary for the storage media 20 to reach the Curie point. A 4 or 5 mm laser beam 29 provided by laser diode 10 passes through a grating 11, a lens 12, a polarizer 13 and a beamsplitter 14 to a movable reflecting mirror 15 and is focused at a point 28 (which represents 1 bit of information) on magnetic material 20 of a storage disk 18 by a movable objective lens 17.

In this manner, bit 28 on the storage disk 18 can be heated, thereby lowering the coercive force required to change the magnetization of the bit. A magnetic field will cause the orientation of the magnetic domain of bit 28 being heated by the laser beam 27 to be reversed. When the laser beam is turned off, the heated bit 28 on the storage disk 18 is cooled in the magnetic field generated by the coil 19, thereby freezing the bit in the desired orientation. The magnetic field generated in the coil 19 by a current is in one direction for writing and in the opposite direction for erasing.

Information is read from the magneto-optical storage disk using a laser beam of reduced intensity. The magnetic film's temperature increase and corresponding coercivity decrease produced by the reading laser beam are small enough that the direction of magnetization is not changed. Because of the magneto-optic phenomenon known as the Kerr effect, the polarization of a laser beam impinged upon the bit positions will be rotated as a function of the magnetic orientation of the bit. The polarization of laser beam portions reflected from bit positions on the disk is detected by opto-electronic detector circuitry, such as photodetectors. Signals from the detecting circuitry are then processed to determine whether the bit position is representative of a digital one or zero.

For data retrieval, the laser beam emitted from the laser diode or other suitable light source 10 travels along a path between optical components 11–15 and 17, is reflected by the magnetic film 20 of the storage disk 18, passes through the lens 17 and is reflected by the mirror 15 to the beamsplitter 14 where some of the beam is passed through the wave plate 21 to the polarizing beamsplitter 22. Beams 29a and 29b upon leaving the polarizing beamsplitter then pass through cylindrical collecting lenses 23 and 24 and are then detected by photodetectors 25 and 26. A detected signal is then processed to extract the information contained therein.

A second function of the optical assembly is to derive tracking and focusing signals. Typically, prior art optical assemblies are provided with a focusing servo mechanism to detect and maintain the focus of the objective lens and a tracking servo mechanism for detecting a track and positioning the optical head such that the optical stylus is directed toward the desired track. Generally, in an optical assembly, the position of the optical stylus relative to a track is corrected using a feedback closed loop position circuit, which includes a two-stage actuator, namely a rough actuator and a fine actuator. The rough actuator is typically a linear actuator which moves the entire optical assembly radially across the optical disk from track to track. The fine actuation, on the other hand, is typically accomplished by rotating the mirror 15 with voice coils 16 and/or radially moving the optical lens 17 with voice coils.

Another known tracking method uses a rotary actuator to move the optical head from track to track. While rotary tracking in magnetic storage systems is superior to linear tracking, as the components are minimal and small allowing for a low profile arm with low inertia, the rotary tracking method used in magneto-optical assemblies has until now been inferior to magnetic rotary tracking systems for two reasons. First, the optical components are heavy, increasing the mass of the optical head, and consequently, the inertia. Second, the optical components are bulky, increasing the size of the optical head, and thus, magneto-optical heads are not capable of being used in multi-head, multi-disk drives. Moreover, if fine actuation is implemented in the typical magneto-optical rotary system, it typically involves a servo actuator for moving the objective lens radially across the tracks, which further increases the mass on the end of the actuator arm and the inertia of the arm.

One improvement in magneto-optical rotary actuators has been to decrease the mass of the arm by moving components off the arm, as described in U.S. Pat. No. 4,688,201 entitled "Focusing and Tracking Apparatus for an Optical Data Storage Device" by David Towner and David Campbell, issued Aug. 18, 1987 to the same assignee as the present application, which is incorporated herein by reference. Although Patent 4,688,201 reduces the weight of the arm, the arm and the overall storage device are still bulky and incapable of multi-head, multi-disks applications.

Focusing is generally accomplished using a closed-loop focus error circuit, which applies a current to a single-axis focus motor whenever a focus error is detected, thus actuating voice coils 30 that move the objective lens vertically to correct the focus of the stylus. The coils 30 react against a radial magnetic field formed by an opposed pair of cylindrical permanent magnets (not shown). This type of focus motor also adds to the weight of the typical optical head, further compounding the mass, bulk and inertia problems described above.

Consequently, the typical optical head measures several centimeters on a side, is 10 to 15 millimeters high, and weighs about 100 grams or more. Owing to its size, weight and the nature of the focus and tracking mechanisms, the standard optical disk assembly is inferior to magnetic disk assemblies in its track-seek time, it's use in multi-head, multi-surface, multi-disk drives, and its use in size critical applications such as lap-top computers and notebook computers. Furthermore, optical and magneto-optical assemblies also entail a complex assembly and adjustment process, as the reduced track spacing and resulting bit densities require greater tracking and focusing precision than magnetic storage systems. Due to the number of expensive components and corresponding complicated assembly, the average optical or magneto-optical storage assembly is much more costly than the average magnetic storage assembly.

Accordingly, there is need in the field of information storage systems for an optical or magneto-optical assembly, that has the customary advantages of stable media and large areal density, but that is also compact in size, light weight, less complex, and more economical. There is further need in the field for an improved optical storage assembly having a low moment of inertia in track-seek operations and having multi-surface, multi-disk capabilities. The present invention meets these and other needs.

SUMMARY OF THE INVENTION

It is an aspect of the present invention to provide an improved low mass, low profile optical head for optical or magneto-optical storage devices.

It is another aspect of the present invention to provide an improved optical assembly that has a track-seek time comparable to that of magnetic storage assemblies.

It is a further aspect of the present invention to provide an improved optical assembly which has fewer components, which is easier to manufacture and assemble, and which costs less than the conventional optical heads of the prior art.

It is yet a further aspect of the present invention to provide an improved optical assembly which is capable of use in multi-surface, multi-disk storage applications, yielding a significantly greater storage capacity over comparably sized magnetic disk drives.

The above and other aspects of the present invention are accomplished in a system which overcomes the disadvantages and limitations of the prior art by providing a rotary actuated optical head with fewer and smaller optical, electrical and mechanical components than traditional optical heads. The present invention also provides an improved source/detector module which is located on the rotary actuator arm concentrated near the pivot point of the rotary actuator. The improved module has fewer components than usual source/detector modules, reducing the rotary inertia and hence the track seek-time. In accordance with the present invention, the source/detector module permits a single plane optical assembly layout, thereby further reducing the overall profile of the optical head.

The present invention provides a simple, low profile, low mass, economical optical storage device that will allow optical drives to be manufactured which have capacities of up to 3200 Mbytes per 3½ inch surface with cost, size and performance levels equal to todays magnetic drives.

BRIEF DESCRIPTION OF THE DRAWINGS

The above and other objects, features and advantages of the invention will be better understood by reading the following more particular description of certain preferred embodiments of the invention, presented in conjunction with the following drawings, wherein.

DETAILED DESCRIPTION OF THE PRESENT INVENTION

Figure 2:
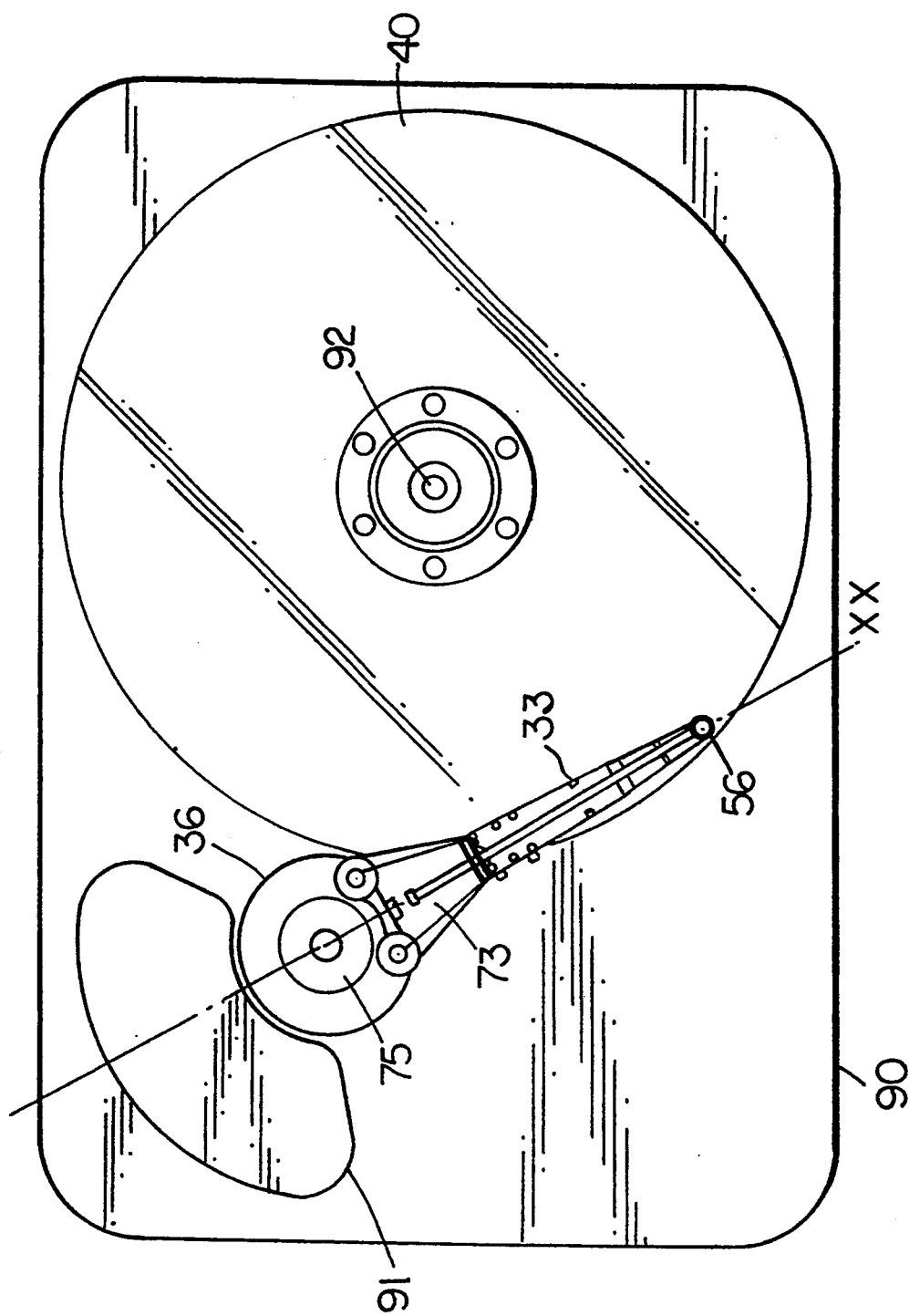
FIG. 2 shows a top perspective view of the rotary optical head, optical or magneto-optical storage disk, and storage assembly implementation of the present invention.

FIG. 2 illustrates a top perspective view of an optical or magneto-optical disk drive apparatus 90, according to the present invention. Disk drive 90 is a rotary actuated memory device, which includes at least one optical storage disk 40 mounted on a spindle motor (not shown) via shaft 92, and rotary actuator arm 33 with focus motor 56 located at one end and source detector module 73 located at the opposite end near the pivot point 75 of the rotary actuator 36. The weight of the rotary actuator arm 33 is counter balanced with counter weight 91 on the opposite side of the rotary actuator 36.

During a data record or retrieval operation, the rotary actuator 36 moves the actuator arm 33 in a rotational manner such that the focus motor 56 is swept across storage disk 40 in a generally arcuate path until the desired track is located. When the desired track is located, the rotary actuator stops and data is recorded or retrieved as the storage disk 40 is rotated about shaft 92 by the spindle motor. The optics within the rotary actuator arm 33, the source/detector module 73 and the focus motor 56 perform data recordation, data retrieval, track seek, laser focus and laser power emission detection as will be described more specifically with regards to FIGS. 3–14.

The present invention allows all of the above mentioned optics to be aligned along a single light path axis extending substantially parallel to the longitudinal axis XX of the actuator arm 33 rather than being located along two different axes as in the prior art. The present invention also minimizes the mass of the focus optics and focus motor 56 located at the end of actuator arm 33 and places the heavier source/detection elements in a source/detector module 73 near the pivot point 75 of the rotary actuator arm 33. In this manner, the moment of inertia of the arm 33 is minimized, and hence, the track seek time is optimized over that of current magneto-optical storage drives. Also, the miniaturization of the optical elements will permit optical or magneto-optical storage systems to be used in size critical applications or in massive storage systems that implement multi-head, multi-disk drives, as in FIGS. 15 and 16.

Having thus described the operation of the magneto-optical disk drive of the present invention in general, the various specific embodiments, components and functions thereof will now be described in greater detail.

FOCUS OPTICS AND MOTOR

Figure 3:
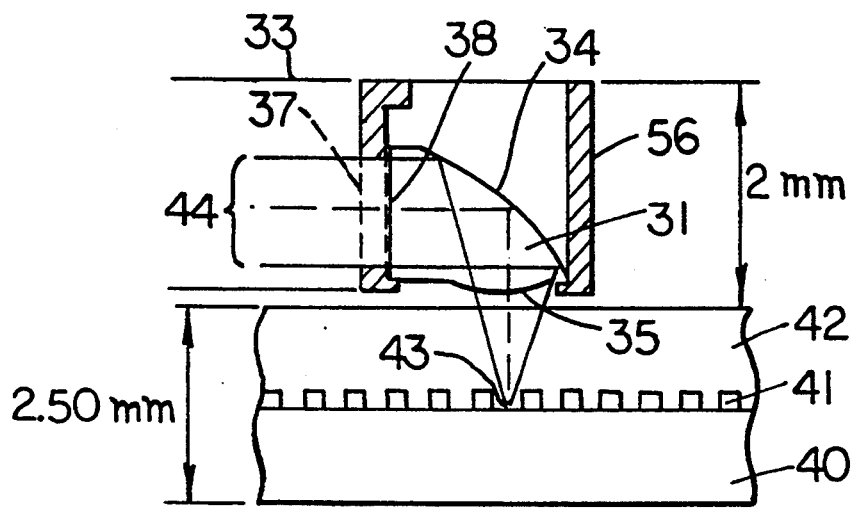
FIG. 3 shows a side cut-away view of the composite objective lens and fold mirror used in a first embodiment of the present invention.

Referring now to FIG. 3, there is illustrated a cut-away view of a composite objective lens and fold mirror 31 supported by the focus motor 56 at the end of the rotary actuator arm 33 opposite the pivot point, according to a preferred embodiment of the present invention. Composite objective lens and fold mirror 31 can be made of molded glass or a plastic of optical quality such as polycarbonate or acrylic. Curved surface 34 has dielectric coatings deposited to create a high internal reflectance and acts as the fold mirror. Curved surfaces 35 and 38 are refractive and act in combination with 34 as the objective lens.

During data recording and retrieval, a laser beam source (not shown) provides a laser beam 44, which travels along the rotary actuator arm 33, passes through a window 37 in the focus motor 56 and enters the composite objective lens and fold mirror 31 at surface 38. Laser beam 44 is then directed by the reflective surface 34 through the refractive surface 35, which focuses the beam at a point 43 on the magnetic recording layer 41 of the storage disk 40. Substrate 42 is a glass or plastic material of low birefringence, which allows the laser beam 44 to pass through to the recording layer 41 without notable optical interference. This embodiment eliminates a separate component for a fold mirror and the cantilevers typically necessary to support a separate fold mirror. Hence, significant reduction in vertical profile is accomplished with this embodiment of the present invention.

The objective lens and fold mirror optics of FIG. 3 are less than 2 mm in vertical height. As will be readily apparent, with objective optics of such a reduced size, the beam size must be scaled from the typical 4 or 5 mm to between 1 and 2 mm along with the focal length so that the numerical aperture remains substantially constant. All first order properties and aberrations scale with the lens size so that smaller lenses have smaller aberrations, which is a meaningful benefit. For example, a 4.5 mm beam size optical head produces 0.7 microns of focus shift for laser power changes from read to write power, which is due to a 3 nm shift of laser wave length. This is a barely acceptable focus error. On the other hand, a 1 mm lens would produce 0.15 microns of focus shift, which is well within the depth of focus.

Figure 1:
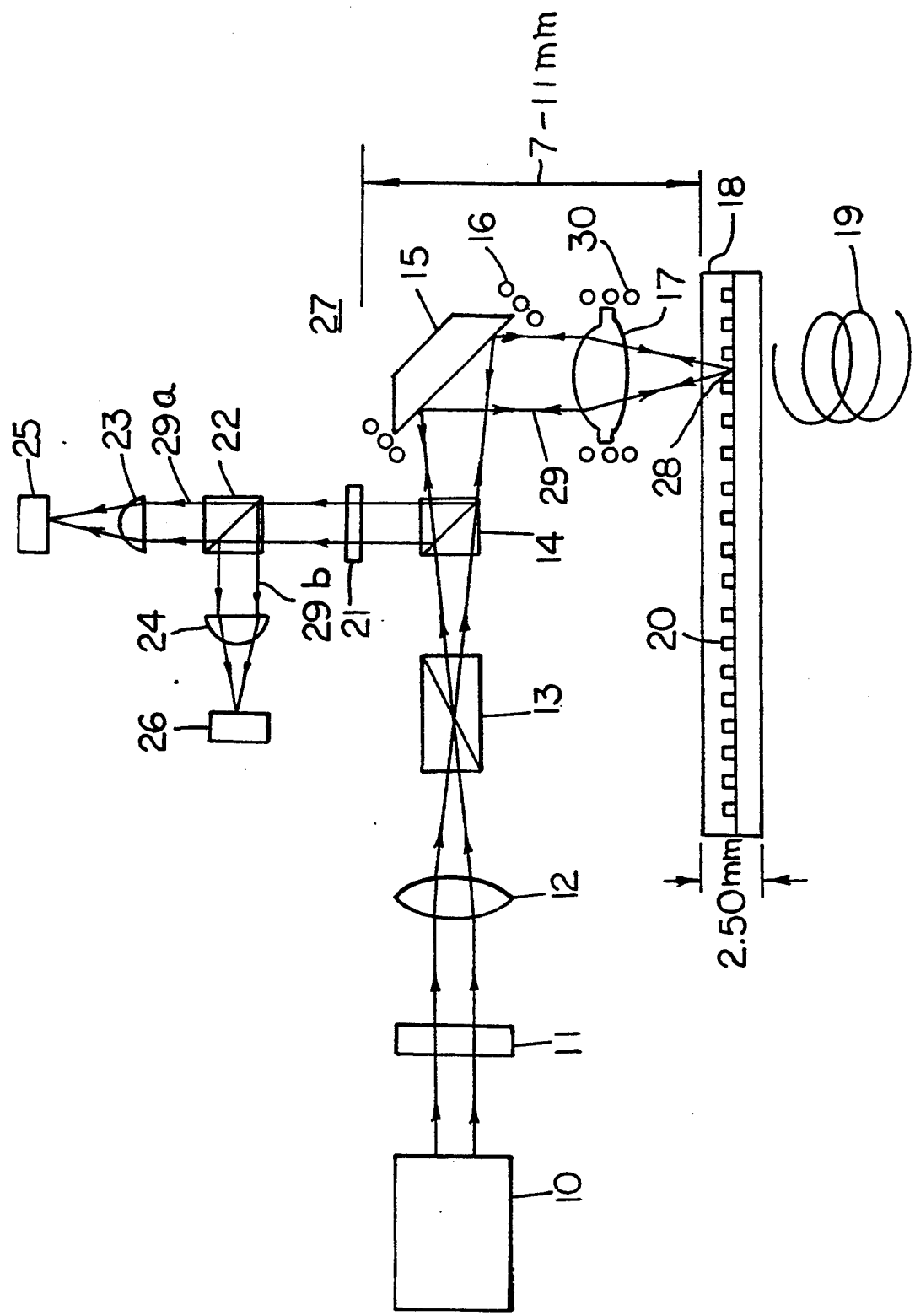
FIG. 1 shows a schematic diagram illustrating the arrangement of a conventional magneto-optical storage system.
Figure 4:
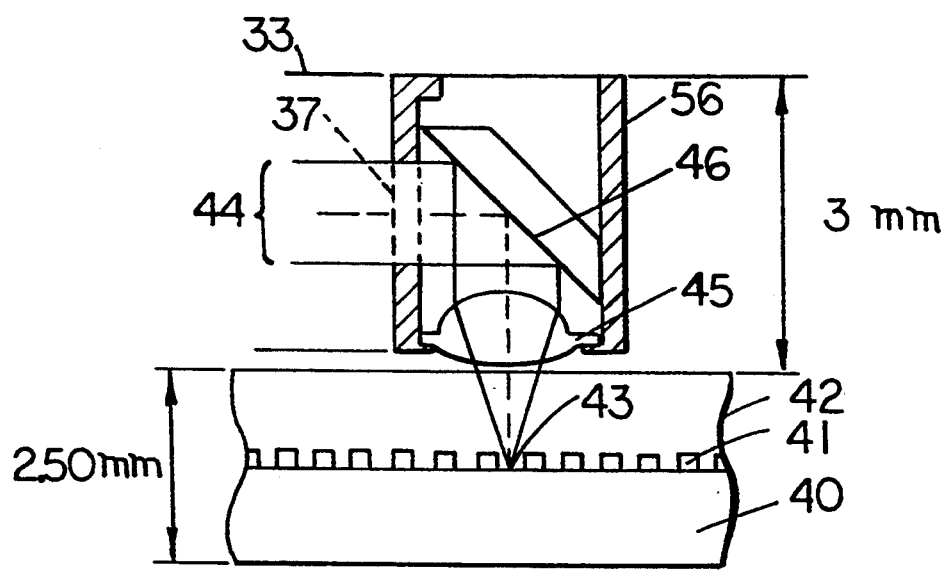
FIG. 4 shows a side cut-away view of a miniaturized objective lens and fold mirror that can both be moved by a single focus motor, which is a second embodiment of the present invention.

FIG. 4 shows a side cut-away view of a miniaturized objective lens 45 and fold mirror 46, which are both supported and moved along an axis perpendicular to the storage disk 40 by a single focus motor 56, according to a second embodiment of the present invention. This embodiment of the present invention allows for a focus optics assembly height above the storage disk 40 of approximately 3 mm, which is profoundly less than the typical 7 to 11 mm vertical height of objective optics over a storage disk, as shown in prior art FIG. 1. This embodiment of the objective optics basically functions in the same manner as the first embodiment with the only material change being that the objective lens 45 and the fold mirror 46 are two discrete components, rather than one composite lens and mirror, as in element 31.

Figure 5:
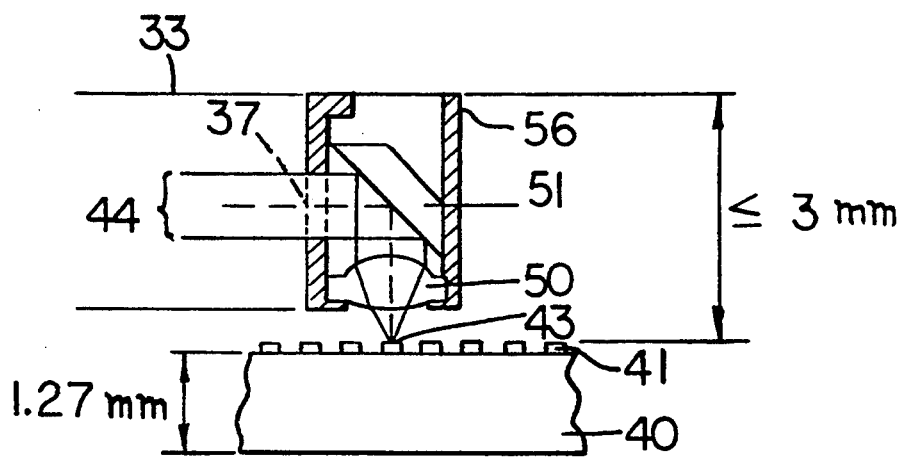
FIG. 5 shows a side cut-away view of a still further miniaturized objective lens and fold mirror that also can both be moved by a single focus motor, which comprises a third embodiment of the present invention.

Referring now to FIG. 5, there is illustrated a side cut-away view of a still further miniaturized objective lens 50 and fold mirror 51, which are both supported and moved along an axis perpendicular to the storage disk 40 by a focus motor 56, according to a third embodiment of the present invention. This embodiment allows for a focus optics assembly height above the storage disk 40 of less than 3 mm, which again is significantly less than the typical focus assembly height of 7 to 11 mm. It should be noted that this embodiment uses an air-incident storage disk, which is an unprotected disk. Thus, the implementation of this embodiment will have to be designed accordingly (i.e., hermetically sealed disk drive).

The objective lens and fold mirror of FIGS. 3-5 can be manufactured using molded glass or optics quality plastic, which permits meaningful size reduction over the ground and polished glass components of the prior art. Diffraction limited lenses of the size and quality required for these optic assemblies are currently being used in fiber optics applications. Having a single focus motor 56 support and move the fold mirror as well as the objective lens in the case of FIGS. 4 and 5 or the composite objective lens/fold mirror assembly in the case of FIG. 3 eliminates the need for separate mirror support cantilevers and allows further size reductions over the prior art. As will be readily apparent to one skilled in the art, the focus motor 56 of FIGS. 3-5 would be scaled with the size of the objective lens and fold mirror assembly.

While the focused spot depth of focus is independent of the lens diameter, as a diffraction phenomena, it is a function of wavelength and numerical aperture. Since a numerical aperture of greater than or equal to 0.5 is required to obtain a micron sized focus spot, the 1.2 mm thick substrate of current magneto-optical storage disks limits the beam size to greater than or equal to 1.5 mm. Thinner substrates or air incident media, as in FIG. 5, are required for beam sizes less than about 1.5 mm. The commercial advantage of using industry standard media may set a temporary lower limit on beam size, and thus, optical head assemblies for most storage systems other than hard disk drives. In hard disk drives, the storage media is not removed, and therefore, the concerns about standardized media and surface dust are irrelevant. Such miniaturized systems, as FIG. 5, would be particularly suited to hard disk drives for laptop computers, notebook computers or other size and mass limited applications.

Figure 6:
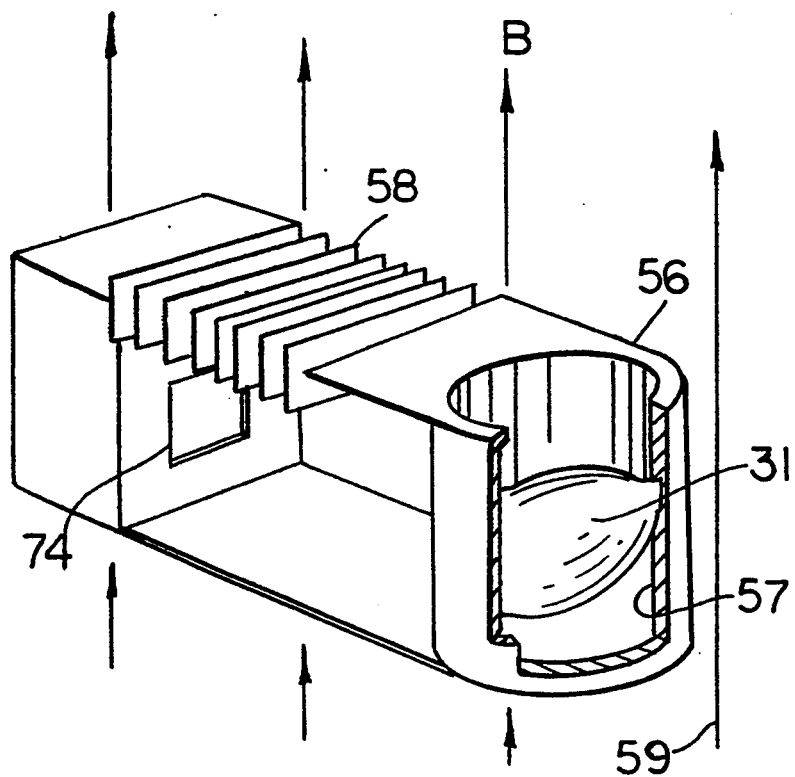
FIG. 6 shows a side perspective view of the focus motor and illustrates how the magnetic field provided for storing and retrieving data can be used to actuate the focus motor, according to a fourth embodiment of the invention.

FIG. 6 shows a side perspective view of the focus motor of a fourth embodiment of the present invention and illustrates how the magnetic field 59 provided for the storage and retrieval of data can be used to actuate the focus motor 56. An active focus servo is required in the present invention to maintain the focused spot on the storage film (not shown). The optical head assembly must provide a means for detecting a focus error (as will be explained more precisely with regard to FIGS. 8-14) and a means for correcting the error, the focus motor 56. The focus motor of FIG. 6 is a scaled focus motor, designed for a 1 to 1.5 mm lens as opposed to prior art motors that moved a 4.5 mm lens. The focus motor 56 moves both the objective lens and the fold mirror, as illustrated in FIGS. 4 and 5, vertically together or the composite objective lens/fold mirror assembly of FIG. 3 when maintaining focus. This allows the elimination of separate cantilever supports for the fold mirror.

For focusing, a laser beam is emitted from a laser source (not shown), passes through window 74 in the source detector module (not shown) and a corresponding window 37 (FIG. 3) in the focus motor 56, is reflected by a fold mirror and focused by an objective lens onto the storage media. An optical sensor (FIGS. 8-14) samples the light reflected from the surface of the storage media and generates a signal proportional to the focus error, the error signal. The error signal drives the focus motor 56, which moves the lens in the direction that reduces the error signal, thus improving the focus. The metal flexures 57 support the lens and prevent all but vertical motion. Flexures 58 act as a flex circuit and react against the magnetic field 59, generated for the storage and retrieval of data, to actuate the focus motor voice coil. The servo system sends current to the motor only when a focus error is detected. The magnetic field 59 is a permanent magnet (not shown) supplying field, perpendicular to the storage film of the storage disk. A magnetic field of three hundred to one thousand oersteds is required to be incident with the laser beam for recording data, which is sufficient for the scaled focus motor 56 of the present invention.

The motion of the objective lens and fold mirror together, as suggested by embodiments 1–3, may result in vignetting of the beam coming into the objective and may result in beam motion of the spot on the servo detector. However, these effects can be minimized by overfilling the objective (make the beam going into the objective slightly larger than the entrance aperture of the lens), using a focus and tracking detection scheme that is relatively immune to beam walk, or requiring a storage disk with a flatness of less than 100 microns.

SOURCE/DETECTOR MODULE

Figure 7:
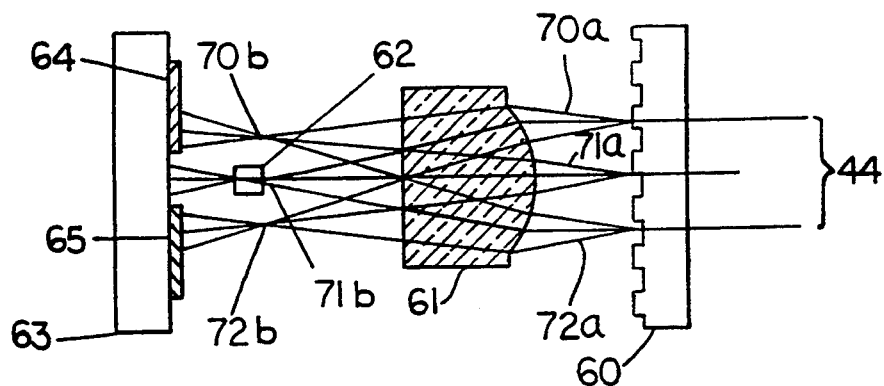
FIG. 7 shows a side cut-away view of the source/detector elements of a fifth embodiment of the present invention.
Figure 8:
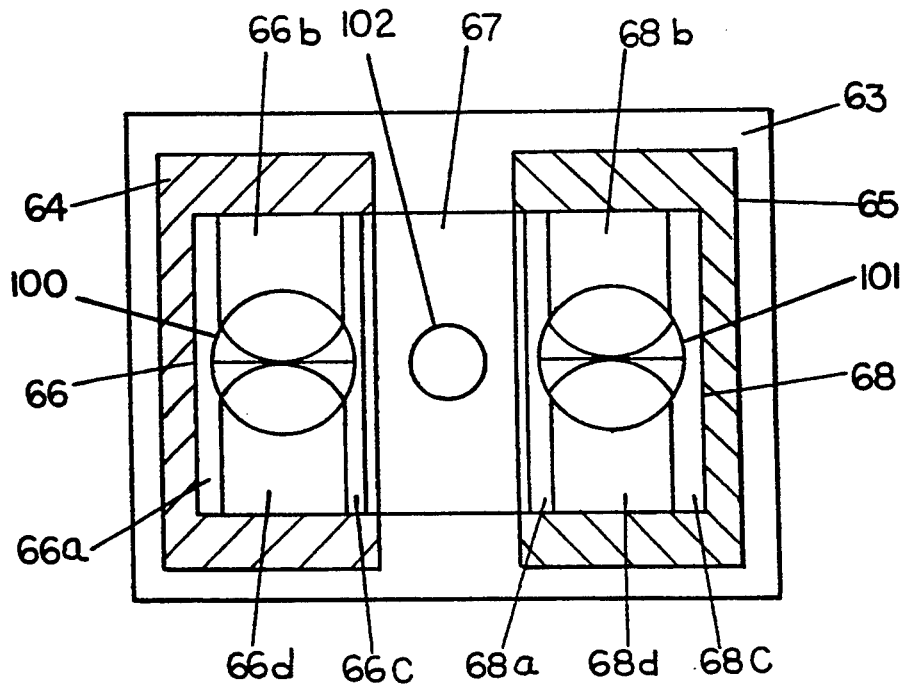
FIG. 8 shows a top perspective view of the source/detector array elements of the fifth embodiment of the present invention.

FIGS. 7–10 show focus motor 56 and source/detector module 73 at either end of rotary actuator arm 33, which is attached to the rotary actuator (not shown) at pivot point 75, according to a fifth embodiment of the present invention. FIGS. 7 and 8 more particularly illustrate the source/detector elements according to the fifth embodiment of the present invention, which includes components for controlling, directing and detecting light emitted to and reflected from the storage disk 40 via the optical system of the present invention. FIG. 7 shows a diffraction grating beamsplitter 60, a molded collimator lens 61 and a laser beam source 62, such as a laser diode. Note that the diffraction grating beamsplitter may alternatively be a birefringent diffraction grating beamsplitter or a holographic beamsplitter. FIGS. 7 and 8 show a photodetector array 63 comprising sheet polarizers 64 and 65 and photodetector 66, 67 and 68 for detecting the rear-facet power emissions, the focus error, the tracking error, and the magneto-optic data signal.

Figure 9:
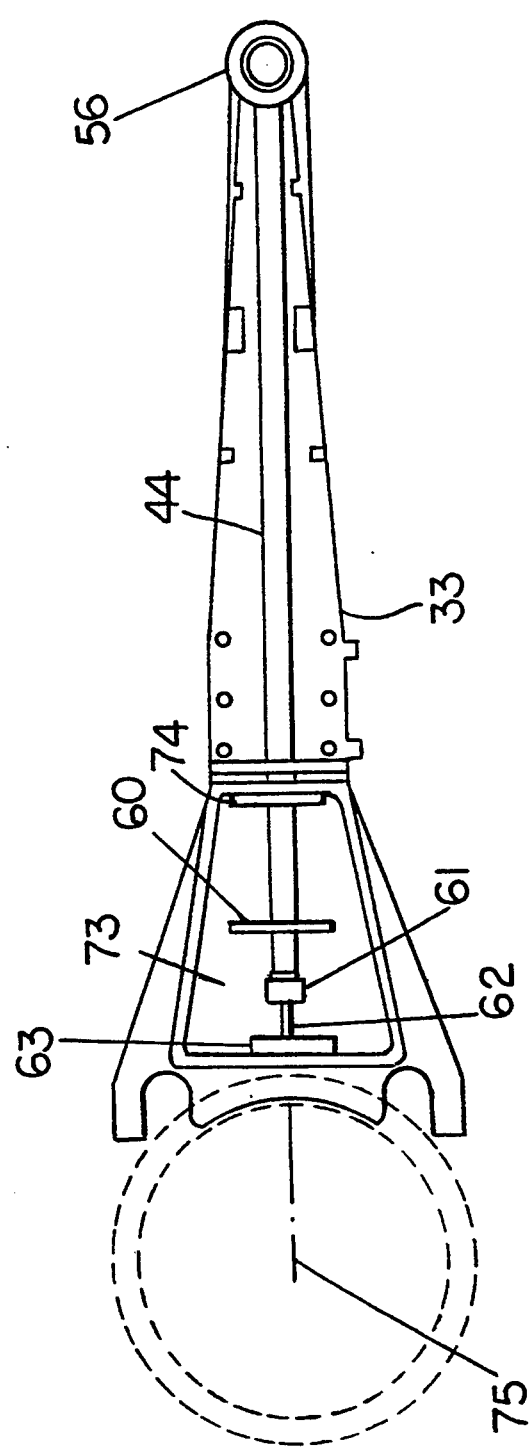
FIG. 9 shows a top perspective view of the rotary actuator arm of the fifth embodiment of the present invention.
Figure 10:
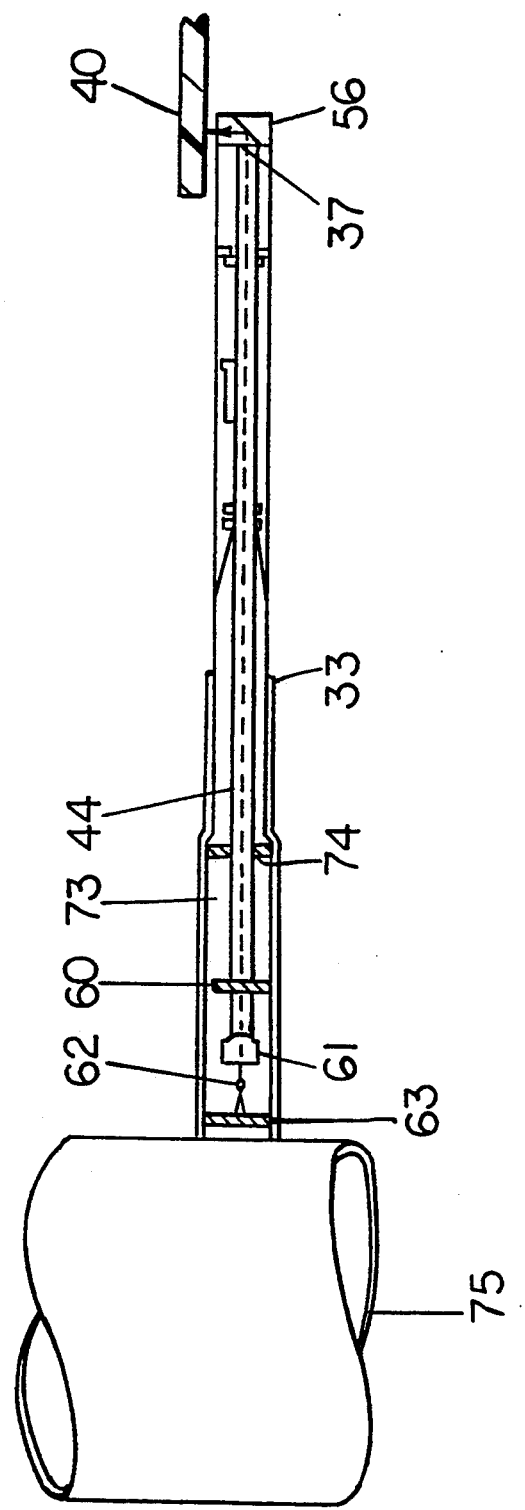
FIG. 10 shows a side cut-away view of the rotary actuator arm of the fifth embodiment of the present invention.

Referring now to FIGS. 9 and 10, the operation of the optical assembly according to the fifth embodiment of the present invention will be described. A laser source 62, such as a laser diode, emits a laser beam 44 from within the source detector module 73 of the rotary actuator arm 33. Laser beam 44 is transmitted through a window 74 in the source/detector module 73, travels along the arm 33, passes through a window 37 in the focus motor 56, and is bent and focused on the storage disk 40 by focusing objective means within the focus motor 56 by one of the methods previously taught by embodiments 1 through 3. Laser beam 44 is reflected by the storage disk 40 back through the focusing objective means, the window 37 of the focus motor 56 and the window 74 of the source/detector module 73.

As the beam 44 passes through the diffraction grating beamsplitter 60, the light returning from the disk 40 is split into three beams, zero order beam 71a, and first order beams 70a and 72a, which pass through the collimator lens 61, FIG. 7. The diffraction grating beamsplitter consists of a glass substrate upon whose surface a series of straight lines are etched using photolithographic processes to produce a surface relief pattern. The depth, spacing and width of these straight lines imparts a phase shift on light that is transmitted through this beamsplitter which results in diffraction.

The zero order beam 71a returns to the laser diode 62. The +1 and −1 order beams, which are used to generate the read signal, the tracking error signal and the focus error signal, 70a and 72a respectively, pass through the sheet polarizers 64 and 65 and are incident on the photodetectors 66 and 68, which are divided into segmented photodetector regions $66_a$, $66_b$, $66_c$, $66_d$, $68_a$, $68_b$, $68_c$, and $68_d$, FIG. 8. The outlines of the +1 and −1 order beams impinging photodetectors 66 and 68 are illustrated in FIG. 8 as circles 100 and 101 on photodetectors 66 and 68, respectively. The sheet polarizer's orientation affects the signal amplitude, and thus, the signal-to-noise ratio. The signal-to-noise ratio is optimized when polarizers 64 and 65 are oriented at $+45°$ and $-45°$; respectively. The two photodetectors 66 and 68 pick up the signals of opposite polarity. Associated circuitry (not shown) differences the two photocurrents produced by the two photodetectors 66 and 68 using the equation $(66_a+66_b+66_c+66_d)-(68_a+68_b+68_c+68_d)$, thus forming a signal twice as large as the signal from a single detector system. In this way, a differential magneto-optical signal (or data read signal) of optimal signal-to-noise ratio is generated.

The +1 and −1 order beams are also used to produce a push/pull tracking error signal. The push/pull tracking error signal is produced by summing and differencing the photocurrents produced by photodetectors 66 and 68 with the equation $(66_b+68_b)-(66_d+68_d)$. The tracking error signal thus formed is then fed back into the tracking system to correct the position of the laser beam on the track of the storage disk.

A one dimensional spot size focus error signal is also generated by use of the +1 and −1 order beams. The spot size focus error signal is produced by summing and differencing the photocurrents produced by photodetectors 6 and 68 using the equation $(66_b+66_d+68_b+68_d)-(66_a+66_c+68_a+68_c)$. In this manner, the focus error signal is produced, which is then used by the focus system to correct the focus of the laser beam on the storage disk.

The photodetector 67, mounted behind the laser diode 62, detects the rear-facet emission of the laser diode 62. The outline of the rear-facet emission beam impinging photodetector 67 is illustrated in FIG. 8 as circle 102 on photodetector 67. The photocurrent generated by photodetector 67 is used to monitor the laser output power, as the rear-facet emission is proportional to the front-facet emission of laser diode 62. Control circuitry (not shown) then adjusts the power of the laser diode 62, depending on whether the operation is a read or a write operation.

The diffraction grating 60 and sheet polarizers 64 and 65 of this embodiment result in magneto-optical signal that are approximately one third as large as typical magneto-optical recording signals. However, laser, media and shot noise are also reduced, which will result in similar signal-to-noise ratios as conventional magneto-optical assemblies.

The rotation of images caused by rotary actuator optical heads may cause focus and tracking error signal crosstalk. However, focus to tracking crosstalk can be controlled by properly controlling the groove profile of the storage disk 40 or by producing a complementary focus error signal. A complementary focus error signal can be produced by using a holographic beamsplitter rather than a diffraction grating beamsplitter 60.

As is known in the art, a holographic beamsplitter consists of a glass substrate upon whose surface lines are etched using photolithographic processes to produce a phase pattern. The etched patterns are not straight lines, but are curved or sometimes irregularly shaped lines that impart a phase shift on the transmitted light which causes diffraction. The diffracted beam is thus split into zero, +1, and −1 order beams which not only propagate at different angles, but also diverge or converge upon exiting the holographic beamsplitter. In this manner, a holographic beamsplitter functions like either a positive or negative lens. In such an embodiment, the +1 order beam would focus ahead of the laser and the −1 order beam would focus behind the laser. At the detector plane, one servo detector would be ahead of focus and one would be behind, thus allowing the generation of a complementary focus error signal which would significantly reject crosstalk.

If desired, the signals could also be boosted by using a birefringent beamsplitter or a birefringent holographic beamsplitter in place of the diffraction grating beamsplitter 60, which would allow this embodiment of the source/detector module to produce magneto-optical signals of roughly the same level as conventional magneto-optical assemblies.

A typical birefringent beamsplitter splits incoming light into two or more separate beams based on the state of polarization of the incoming beam. The birefringent beamsplitter is constructed of two pieces of birefringent materials such as quartz arranged so that the birefringent fast axes of these parts are oriented orthogonal to one another. This beamsplitter splits the light of one polarization state into one beam, light of a different polarization state into a second beam and light which is a mixture of both polarization states into a third beam.

As is known in the art, a birefringent holographic beamsplitter functions in an analogous manner as a birefringent beamsplitter. However, rather than constructing it of prism shaped birefringent materials, it is constructed of a single planar piece of birefringent material upon whose surface patterns are photolithographically etched. Ions are generally implanted in either straight or curved lines on the surface to produce a birefringent holographic beamsplitter.

As a single sub-micron dust particle could obliterate the laser beam 44 emerging from the miniature laser diode 62, the source/detector module 73 should be hermetically sealed, allowing the beam 44 to exit and reenter through a small glass window 74. Alternatively, the diffraction grating element 60 could serve as the output window 74, further eliminating the components and weight of the rotary actuator arm 33.

Referring now to FIGS. 11 through 14, the operation of the optical assembly according to the sixth embodiment of the present invention will be described. The sixth embodiment is similar to the fifth embodiment, except where described differently. FIGS. 11 through 14 show focus motor 56 and source detector 73 at either end of rotary actuator arm 33, which is attached to the rotary actuator (not shown) at pivot point 75.

Figure 11:
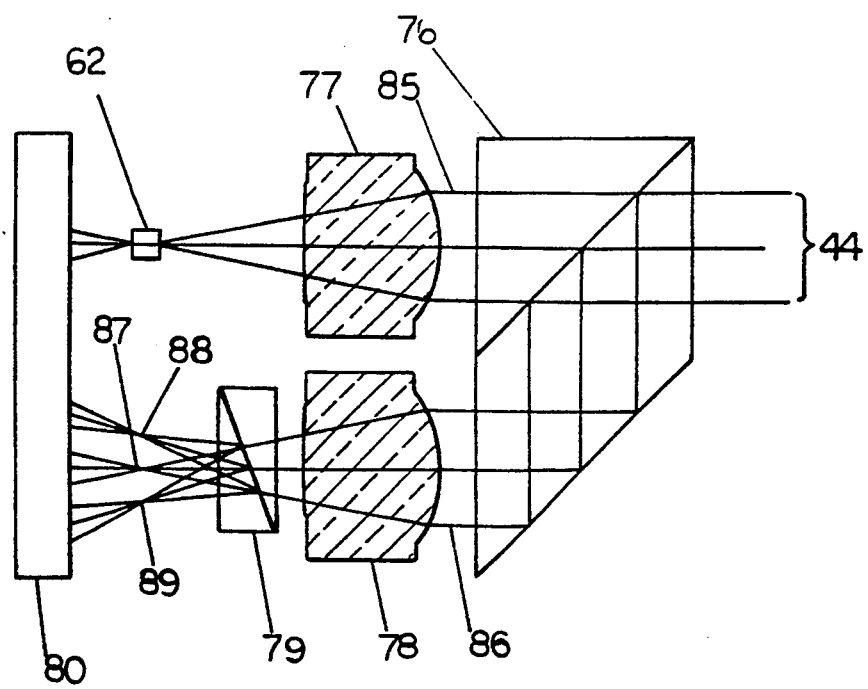
FIG. 11 shows a side cut-away view of the source/detector array elements of a sixth embodiment of the present invention.
Figure 12:
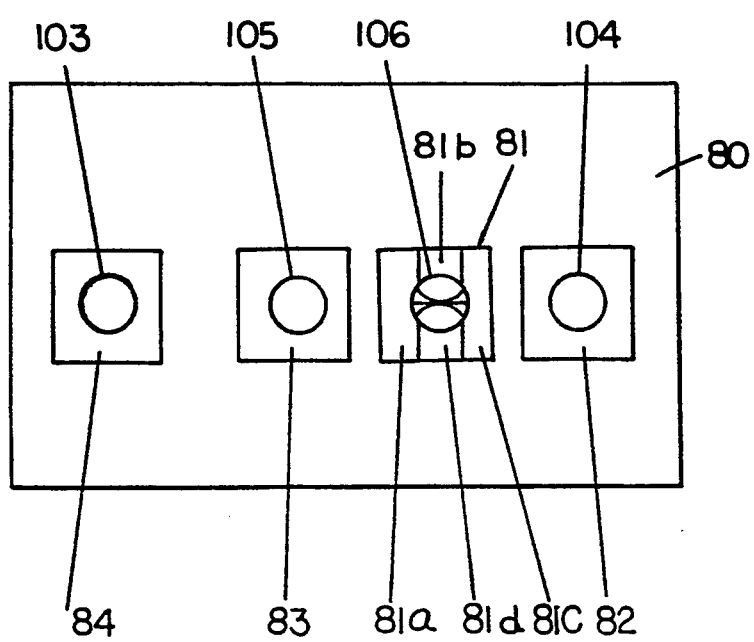
FIG. 12 shows a top perspective view of the source/detector array elements of the sixth embodiment of the present invention.

FIGS. 11 and 12 more particularly depict the elements of source/detector module 73 of the sixth embodiment, which includes a 2 mm leaky beamsplitter and fold mirror 76, molded collimator lenses 77 and 78, laser source 62, photodetector array 80 and a beamsplitter 79, such as a Rochon beamsplitter, which is made by bonding together two prisms of birefringent material with orthogonal fast axes. The photodetector array 80 contains a photodetector 84 for rear-facet power emission detection, a split photodetector 81 for focus and tracking detection and two photodetectors 82 and 83 for differential signal detection.

Figure 13:
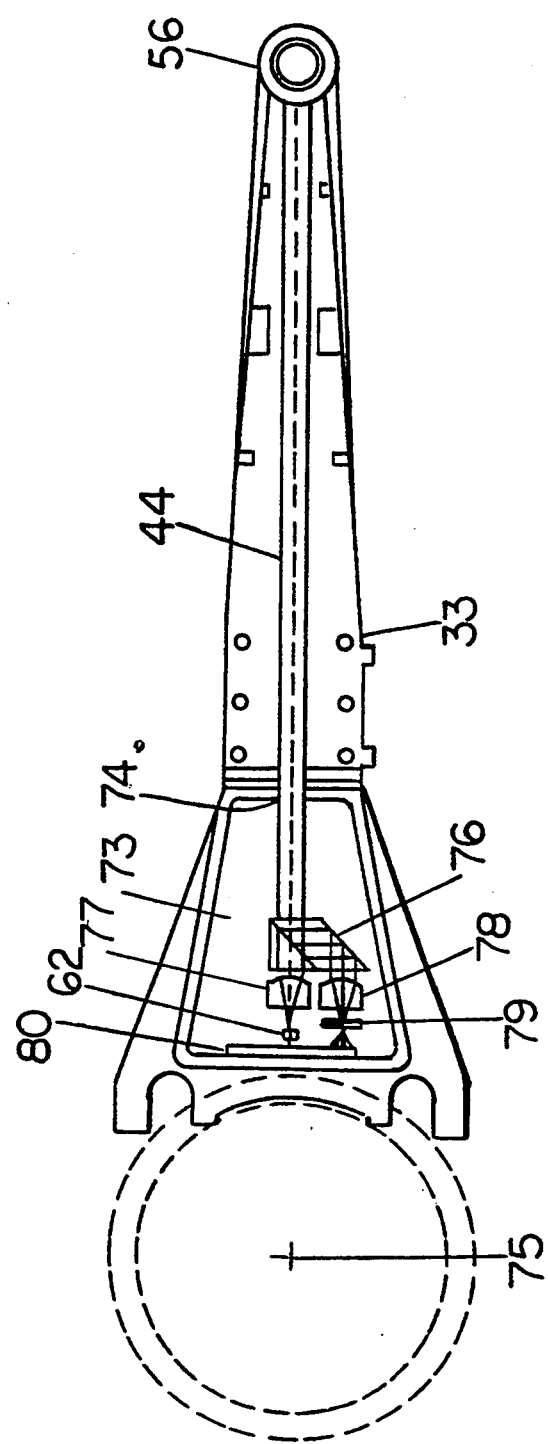
FIG. 13 shows a top perspective view of the rotary actuator arm of the sixth embodiment of the present invention.
Figure 14:
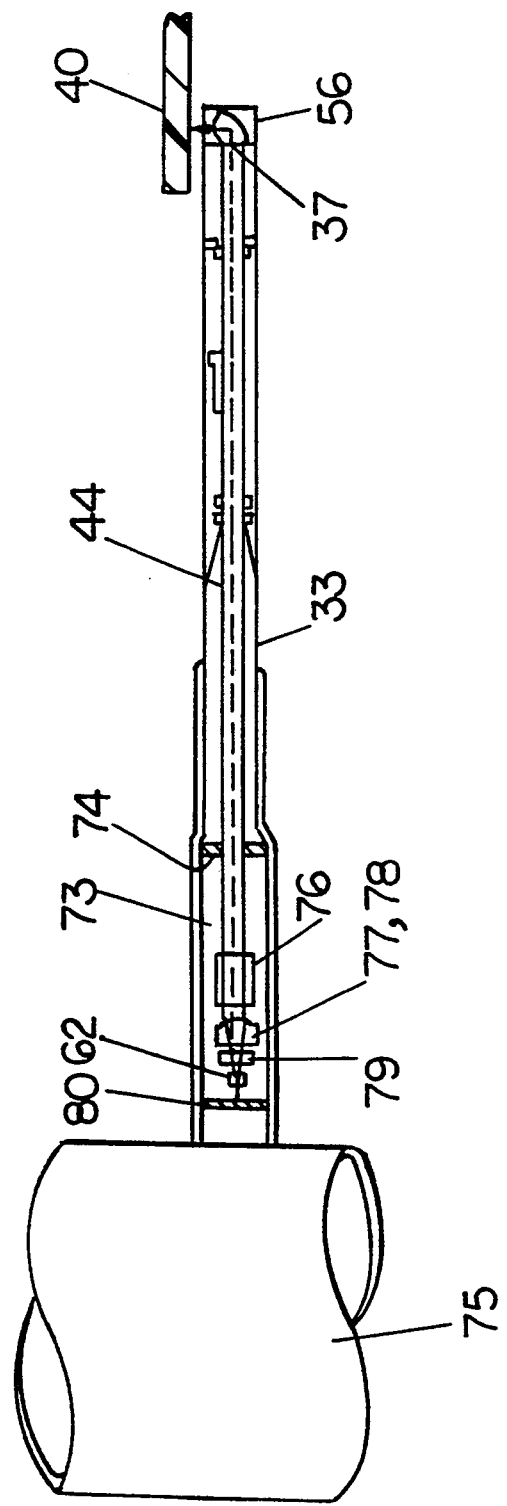
FIG. 14 shows a side cut-away view of the rotary actuator arm of the sixth embodiment of the present invention.

FIGS. 13 and 14 illustrate the complete optical assembly in cooperation. During operation, a laser source 62, such as a laser diode, emits a laser beam 44 from within the source/detector module 73 of the rotary actuator arm 33. Laser beam 44 travels through a window 4 in the source/detector module 73, traverses along the rotary actuator arm 33, passes through a window 37 in the focus motor 56, and is bent and focused onto the storage disk 40 by focusing objective means within the focus motor 56. (The focus objective means can be any of the formerly addressed embodiments 1 through 3.) Laser beam 44 is reflected by storage disk 40 back through the focusing objective means, focus motor window 37, and source/detector module window 74.

As the beam 44 passes through the 2 mm leaky beamsplitter and fold mirror 76, the light beam 44 returning from storage disk 40 is split into two component beams, beam 85 and data and servo beam 86. A 2 mm leaky beamsplitter splits a beam into two separate beams based on the incoming polarization state of the beam. A leaky beamsplitter fold mirror combination is fabricated using two glass prisms, one triangular in shape, one a parallelogram. The hypotenuse face has multilayer dielectric coatings designed to provide the required polarization splitting, applied before the two glass prisms are glued together.

Beam 85 passes through collimator lens 77 and returns to the laser diode 62. The data and servo beam 86 travels through collimator lens 78 and is then split into three beams, a focus and tracking beam 87, and two differential data signal beams 88 and 89 with orthogonal polarizations by a birefringent beamsplitter 79 (described above), such as a Rochon beamsplitter.

The photodetector 84, mounted behind the laser diode 62, detects the rear-facet emission of the laser diode 62. The outline of the rear-facet emission beam impinging photodetector 84 is illustrated in FIG. 12 as circle 103 on photodetector 84. The photocurrent generated by photodetector 84 is used to monitor the laser output power, as the rear-facet emission of laser diode 62 is proportional to the front-facet emission. Control circuitry (not shown) then adjusts the power of laser diode 62, depending on whether it is a read or a write operation in progress.

The two differential signal photodetectors 82 and 83 pick up the signals of opposite polarity from beams 88 and 89. The outline of the beams 88 and 89 impinging photodetectors 82 and 83 are illustrated in FIG. 12 as circles 104 and 105 on photodetectors 82 and 83, respectively. Associated circuitry (not shown) differences the two photocurrents produced by the two photodetectors 82 and 83, forming a signal twice as large as the signal produced by a single detector system. Thus, a magneto-optical data signal is generated with an optimized signal-to-noise ratio.

The focus and tracking detector 81, which is divided into segmented photodetector regions $81_a$, $81_b$, $81_c$ and $81_d$, produces a focus error signal and a tracking error signal in the following manner. First, the push/pull tracking error signal is produced by differencing $81_b$ and $81_d$. Second, the focus error signal is generated by the equation $(81_b+81_d)-(81_a+81_c)$. Once the focus and tracking error signals are produced these signals are used to correct the focus and position of the laser beam on the storage disk. The outline of the focus and tracking beam 87 impinging photodetector 81 is illustrated in FIG. 12 as circle 106 on photodetector 81.

Most of the improvements and modifications suggested for the source/detector module of the fifth embodiment can also be applied to this embodiment. For example, a complementary focus error signal could also be implemented in this source/detection system and the source/detector module of this embodiment should also be hermetically sealed to prevent dust particles from interfering with the laser beam 44 as it emerges from the laser diode 62.

TRACKING

Coarse tracking is accomplished by applying the tracking error signal produced by the servo detector system to the rotary actuator 75, which then moves the rotary arm 33 radially across the tracks of disk 40 until the desired track is found. The tracking servo system then keeps the laser beam continually directed at the chosen track until another track is requested.

Figure 15:
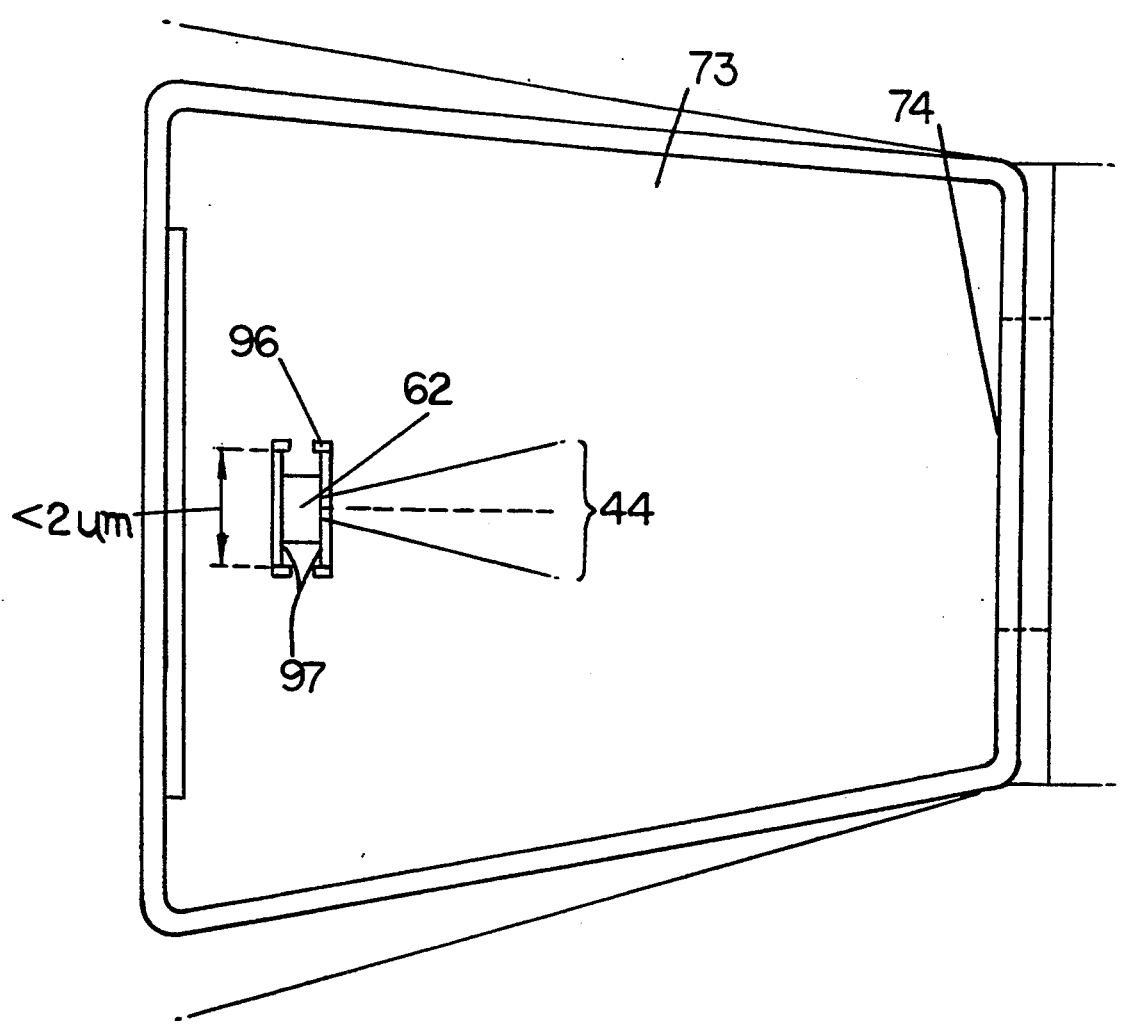
FIG. 15 shows a top perspective view of the rotary actuator arm of a seventh embodiment of the present invention.
Figure 16:
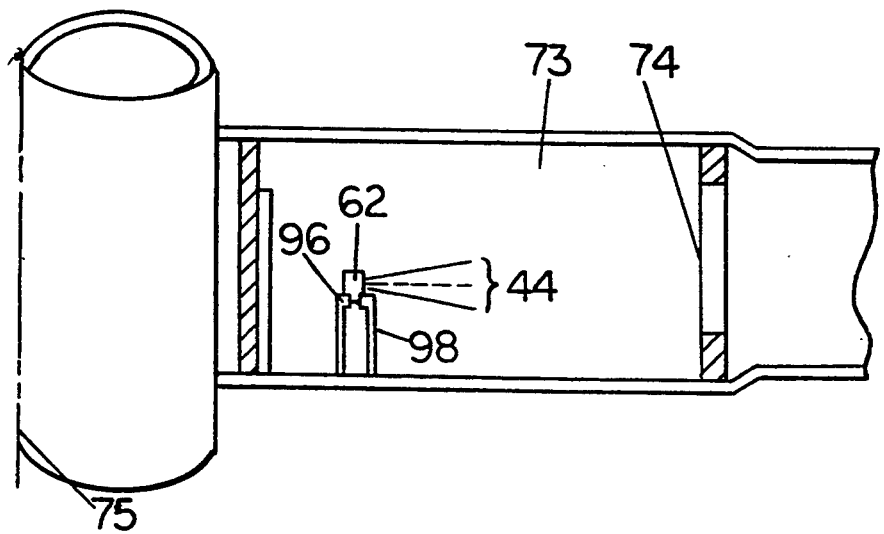
FIG. 16 shows a side cut-away view of the rotary actuator arm of the seventh embodiment of the present invention.

FIGS. 15 and 16 illustrate a two stage tracking implementation of the present invention. For two stage tracking, the coarse tracking is accomplished as described above. Fine tracking is achieved by mounting the laser diode 62 on a pair of parallelogram voice coil flexures 97, which move the laser diode laterally between ends 96 of supports 98. Only small motions of less than 2 microns are necessary; a servo loop prevents further movement. The small lateral movement of diode 62 will result in a corresponding fine radial translation of the focused spot 43 on the disk 40, allowing fine tracking. In order to determine the location of the fine actuator relative to the coarse actuator, a split detector is used for the laser rear facet power monitor. As the laser is translated, the spot is scanned on the disk 40 and the rear facet output of the laser is scanned across the split. The fine tracking system should be operated at 2 to 8 kHz for optimal tracking precision. The voice coils moving the laser diode may also be designed to be actuated by the magnetic field supplied for write operations as described for the focus motor above.

Figure 17:
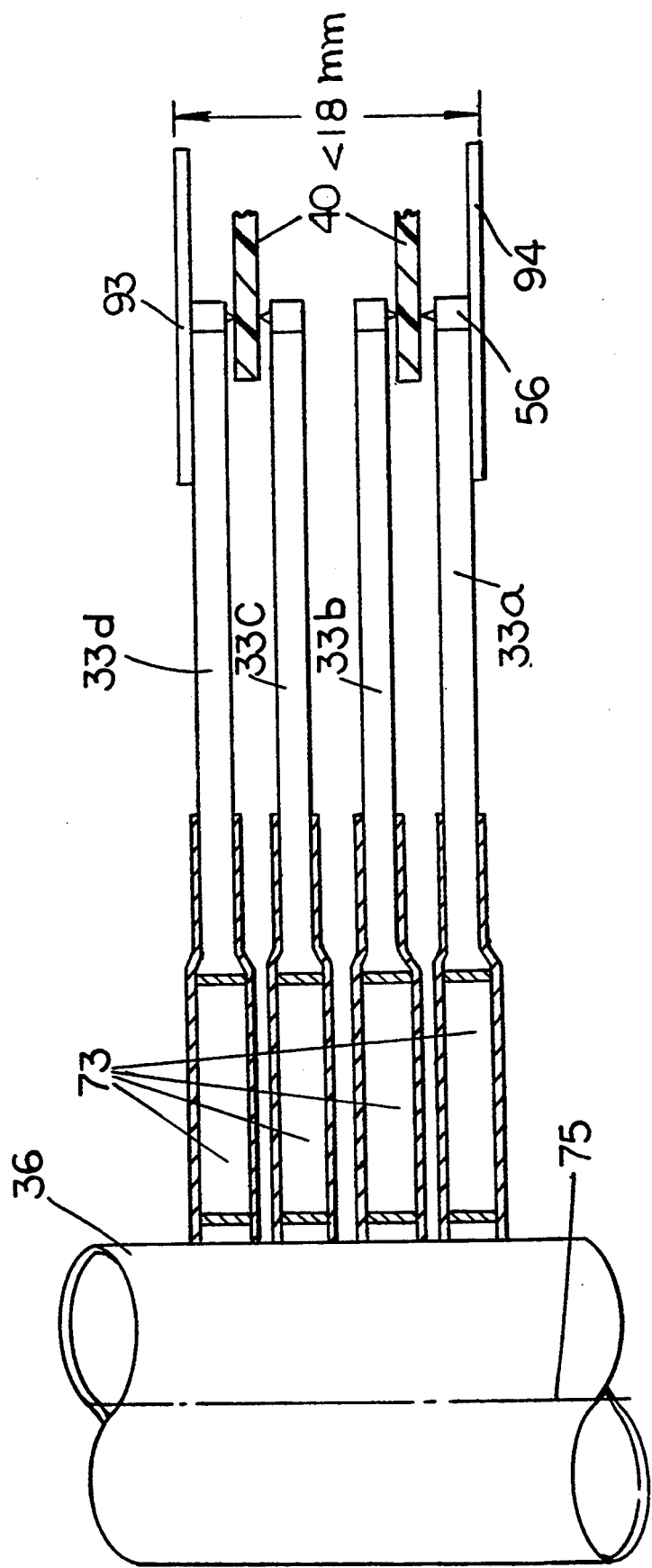
FIG. 17 shows a side cut-away view of a multi-head, multi-disk optical or magneto-optical storage assembly implementation of the present invention.
Figure 18:
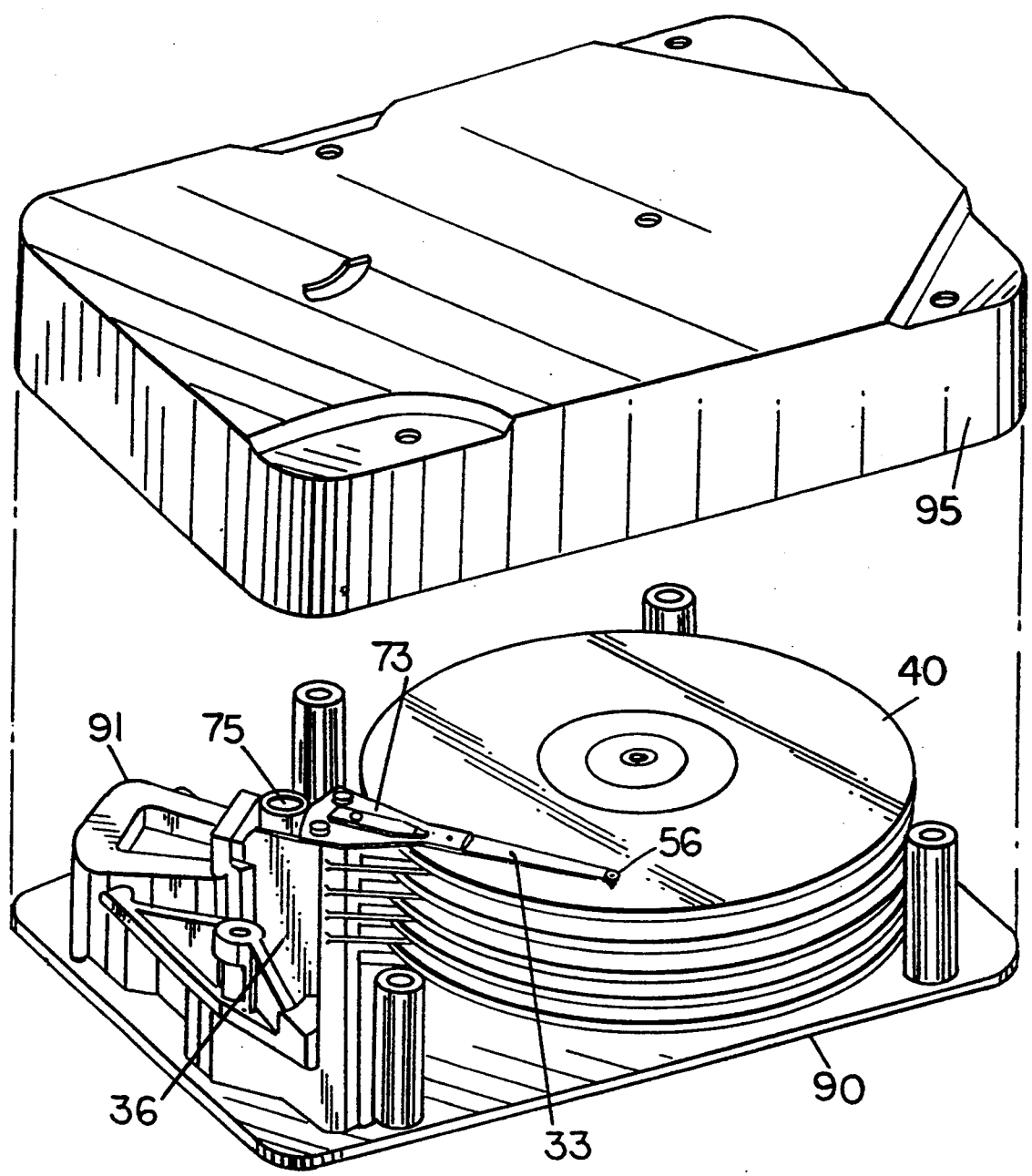
FIG. 18 shows an exploded perspective view of one implementation of the invention being used in a multi-head, multi-disk optical or magneto-optical storage assembly drive.

FIGS. 17 and 18 illustrate the implementation of the present invention in a multi-head, multi-disk storage application, in which a rotary actuator 36 rotationally moves rotary actuator arms 33a–d in a generally arcuate motion along the radii of storage disks 40. The rotary actuator arms 33a–d include focus motors 56 located at the end of the arm furthest from the pivot point 75 and source detector modules 73 located at the end of the arms nearest to the pivot point 75. All of the rotary actuator arms 33a–d are counter balanced by counter weight 91. Also shown are pole pieces 93 and 94 above the top arm 33d and below the bottom arm 33a, respectively for creating the bias field necessary for recordation and to actuate the focus motor 56. FIG. 17 shows that two standard double sided storage disks 40 can be recorded to and read from by four optical assemblies of the present invention with a vertical profile of approximately 18 mm or less. FIG. 18 shows the implementation of several optical assemblies of the present invention into a magneto-optical storage disk drive 90 with cover 95.

The foregoing description of the invention has been presented for purposes of illustration and description. It will be readily apparent to one of ordinary skill in the art that the focusing, source/detector and tracking embodiments can be combined in different ways depending on the particular storage system needs, i.e. size, focusing precision, tracking precision, etc. The foregoing description is not intended to be exhaustive or to limit the invention to the precise form disclosed, and other modifications and variations may be possible in light of the above teachings. For example, the optical elements could be made of plastic or any other suitable optical media rather than glass and the actuator arm could be made of plastic or any other rigid composite material rather than metal, in order to further reduce the mass of the assembly as would be readily apparent to one skilled in the art. Also, as previously stated, the storage assembly could be optical or magneto-optical with minimal changes to the optical elements described as will be readily evident. The embodiments were chosen and described in order to best explain the principles of the invention and its practical applications to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for use in a magneto-optical information recordation and retrieval device having a rotating optical storage disk for recording information along concentric or spiral tracks in a recording layer and retrieving information therefrom, said apparatus comprising:

a rotary actuator arm with a first end and a second end, said rotary actuator arm having a rotational axis perpendicular to said rotary actuator arm at said first end about which said rotary actuator arm rotates;

a magnetic bias field source for causing information to be stored in said recording layer of said storage disk, said magnetic bias field source being located off said rotary actuator arm;

a source/detector module for enclosing and mounting optical components for use in recording information along said tracks in said recording layer of said rotating optical storage disk and retrieving information therefrom, said source/detector module located on said rotary actuator arm adjacent said rotational axis at said first end;

a light source mounted in said source/detector module for generating a beam of light, said beam of light directed along a path substantially parallel to said rotary actuator arm toward said second end of said rotary actuator arm;

fold means for receiving and redirecting said beam of light generated by said light source;

objective lens means for receiving redirected light from said fold means and focusing said redirected light into a spot of light on said recording layer of said rotating optical storage disk;

a focus motor mounted at said second end of said rotary actuator arm for supporting said fold means and said objective lens means and repositioning said fold means and said objective means simultaneously whenever a focus error is received by said focus motor and thereby maintaining focus of said spot of light on said recording layer of said optical storage disk, said focus motor being activated by the same magnetic bias field that causes the magneto-optical recordation of information in said recording layer of said storage disk;

a beamsplitter mounted in said source/detector module for splitting a beam of light returning from said rotating optical storage disk into a data beam and a servo beam;

a data detector mounted in said source/detector module for generating data signals derived from said data beam, said data beam being optically coupled to said data detector; and a focus and tracking detector mounted in said source/detector module for generating focus and tracking error signals from said servo beam, said servo beam being optically coupled to said focus and tracking detector, said light source, said fold means, said beamsplitter, said data detector and said focus and tracking detector being arranged in such a manner that said beam of light travels in a substantially planar path from said light source in said source/detector module along said rotary actuator arm to said fold means, and after being reflected by said storage disk, said light travels in the same substantially planar path from said fold means along said rotary actuator arm to said data detector and said focus and tracking detector in said source/detector module, said substantially planar path being substantially parallel to said optical storage disk, said data detector and said focus and tracking detector being located behind said light source, said beam splitter being located in front of said light source.

2. The apparatus according to claim 1 wherein said fold means comprises a fold mirror.

3. The apparatus according to claim 1 wherein said fold means and said objective lens means comprise a composite objective lens and fold mirror.

4. The apparatus according to claim 1 wherein said magnetic bias field source is not structurally supported by said rotary actuator arm.

5. The apparatus according to claim 1 wherein said focus motor has a vertical profile of approximately 3 mm or less.

6. The apparatus according to claim 1 wherein said source/detector module comprises a hermetically sealed module with a window for a beam of light to pass in and out thereof, said beamsplitter comprising said window of said hermetically sealed module.

7. The apparatus according to claim 1 wherein said light source is mounted on a pair of parallelogram flexures for providing fine tracking during recording and retrieval operations, said parallelogram flexures having voice coils which are actuated by the same magnetic bias field that causes the magneto-optical recordation of information in said recording layer of said storage disk.

8. An apparatus for use in a magneto-optical information recordation and retrieval device having a rotating optical storage disk for recording information along concentric or spiral tracks in a recording layer and retrieving information therefrom, said apparatus comprising:

a rotary actuator arm with a first end and a second end, said rotary actuator arm having a rotational axis perpendicular to said rotary actuator arm at said first end about which said rotary actuator arm rotates;

a magnetic bias field source for causing information to be stored in said recording layer of said storage disk, said magnetic bias field source being located off said rotary actuator arm;

a hermetically sealed source/detector module for enclosing and mounting optical components for use in recording information along said tracks in said recording layer of said rotating optical storage disk and retrieving information therefrom, said source/detector module located on said rotary actuator arm adjacent said rotational axis at said first end;

a light source mounted in said source/detector module for generating a beam of light, said beam of light directed along a path substantially parallel to said rotary actuator arm toward said second end of said rotary actuator arm;

a composite fold mirror and objective lens for receiving said beam of light from said light source means and redirecting said beam of light toward said storage disk and focusing said beam of light onto a spot of light on said storage disk;

a focus motor of approximately 3 mm of less in height mounted at said second end of said rotary actuator arm for supporting said fold means and said objective lens means and repositioning said fold means and said objective means simultaneously whenever a focus error is received by said focus motor and thereby maintaining focus of said spot of light on said recording layer of said optical storage disk, said focus motor being activated by the same magnetic bias field that causes the magneto-optical recordation of information in said recording layer of said storage disk;

a beamsplitter mounted in said source/detector module for splitting a beam of light returning from said rotating optical storage disk into a data beam and a servo beam, said beam splitter comprising a window in said hermetically sealed source/detector module for said beam of light to enter and exit therefrom, said beam splitter being mounted in front of said light source;

detector means mounted behind said light source in said source/detector module for generating a data signal from said data beam and focus and tracking error signals from said servo beam, said light source, said composite fold mirror and objective lens, said beamsplitter and said detector means mounted in said rotary actuator arm in such a manner that said beam of light travels in a substantially planar path from said light source in said source/detector module along said rotary actuator arm to said composite fold mirror and objective lens and after being reflected by said storage disk, said light travels in the same substantially planar path from said fold means along said rotary actuator arm to said detector means in said source/detector module.

* * * * *